A. F. DONALDSON.
INNER AND OUTER BROACHING MACHINE.
APPLICATION FILED MAY 19, 1917.
1,318,486.
Patented Oct. 14, 1919.
5 SHEETS—SHEET 1.
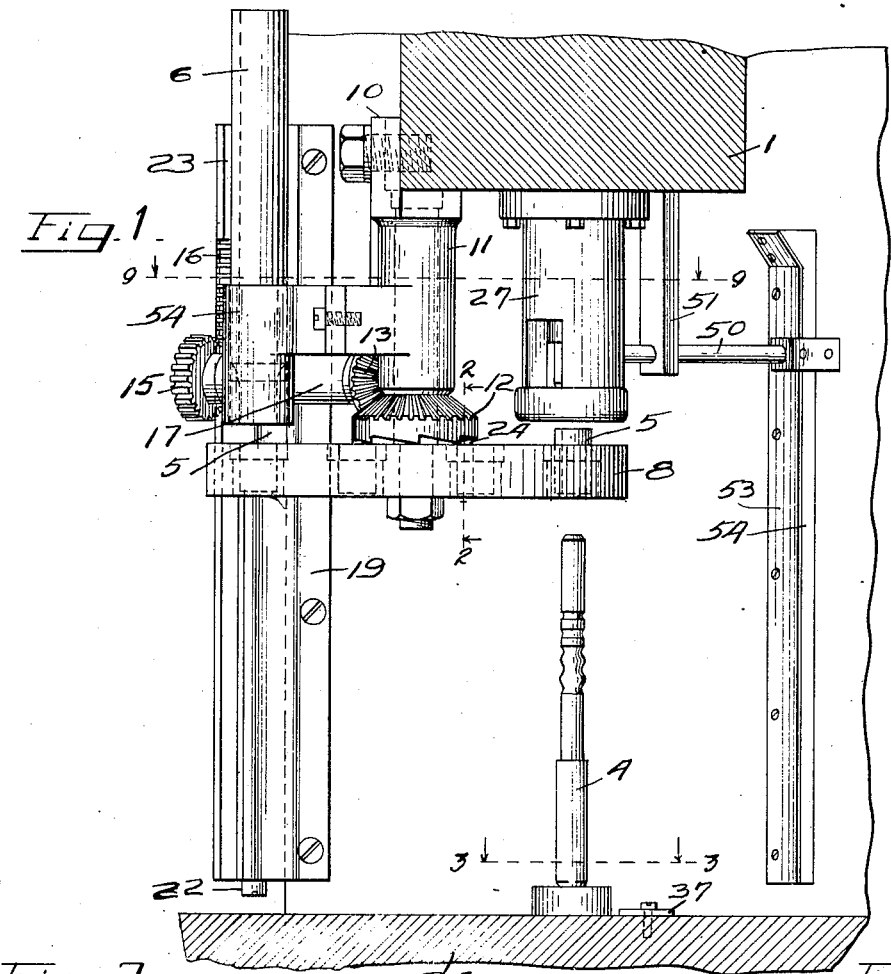
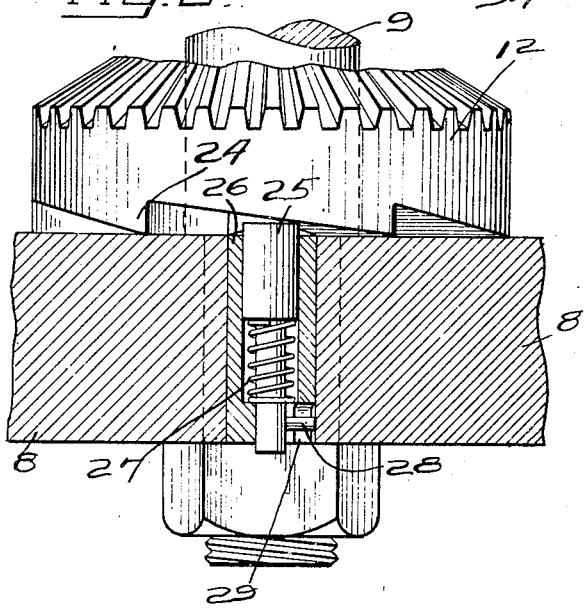
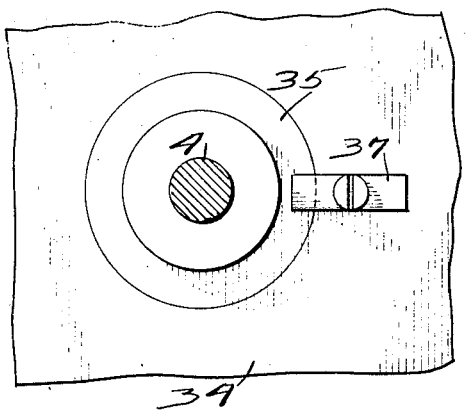
Inventor.
Augustus F. Donaldson
by
Owen, Owen & Crampton A. F. DONALDSON.
INNER AND OUTER BROACHING MACHINE.
APPLICATION FILED MAY 19, 1917.
1,318,486.
Patented Oct. 14, 1919.
5 SHEETS—SHEET 2.
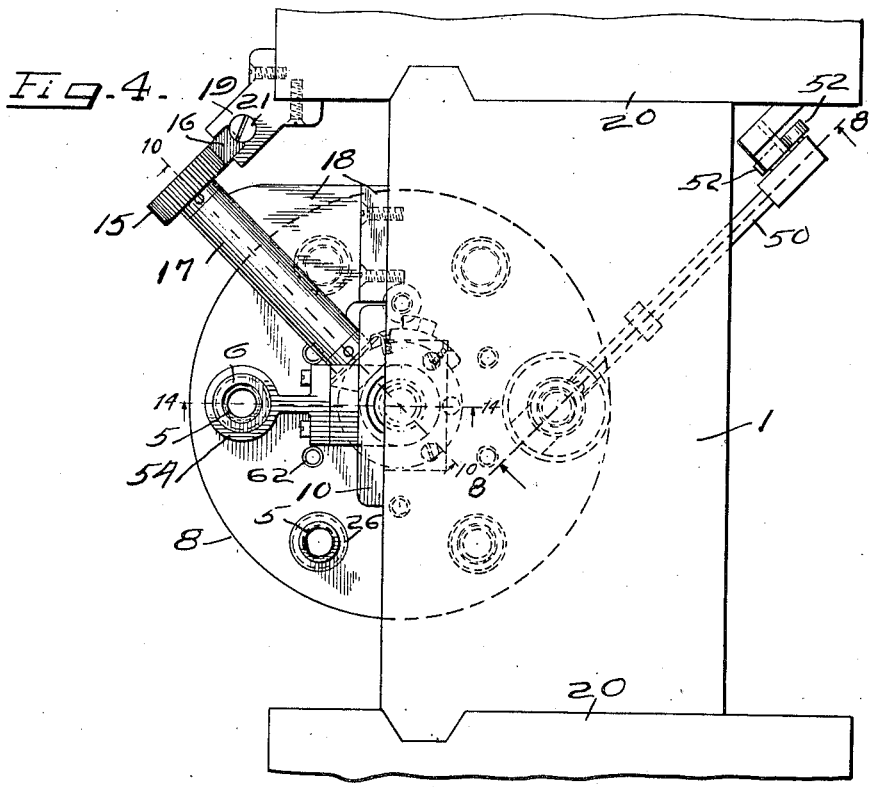
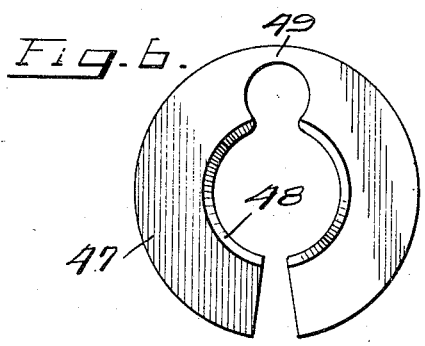
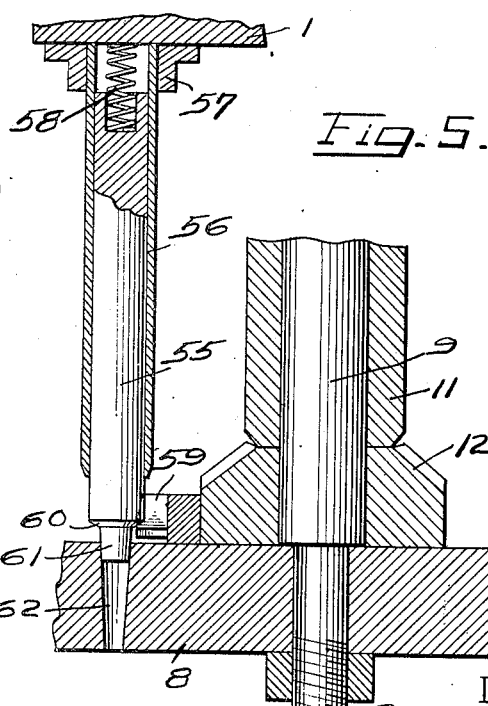
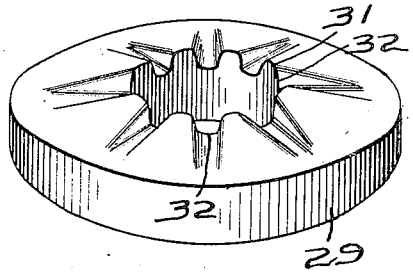
Inventor.
Augustus F. Donaldson
by
Owen, Owen & Crampton

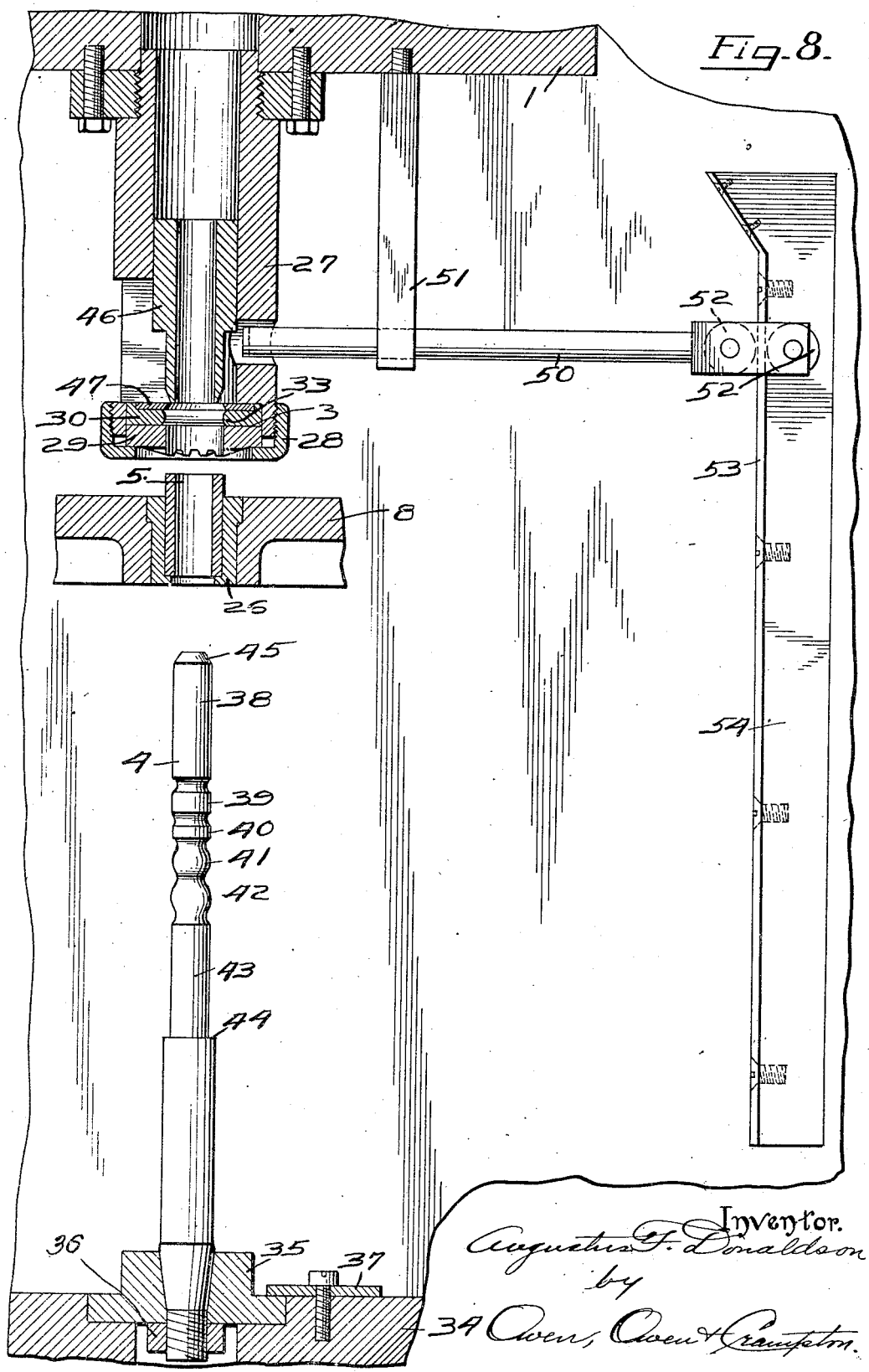

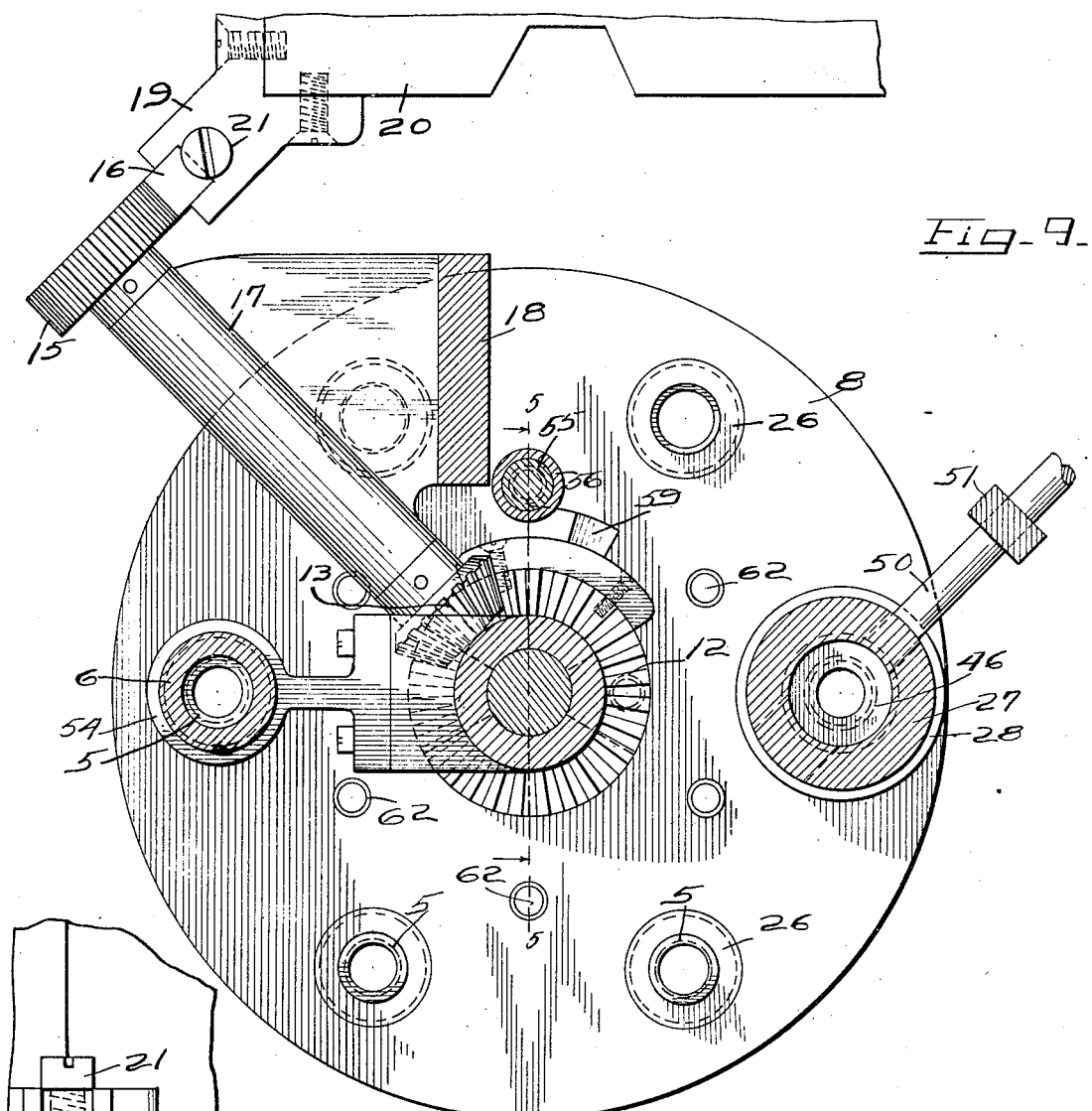

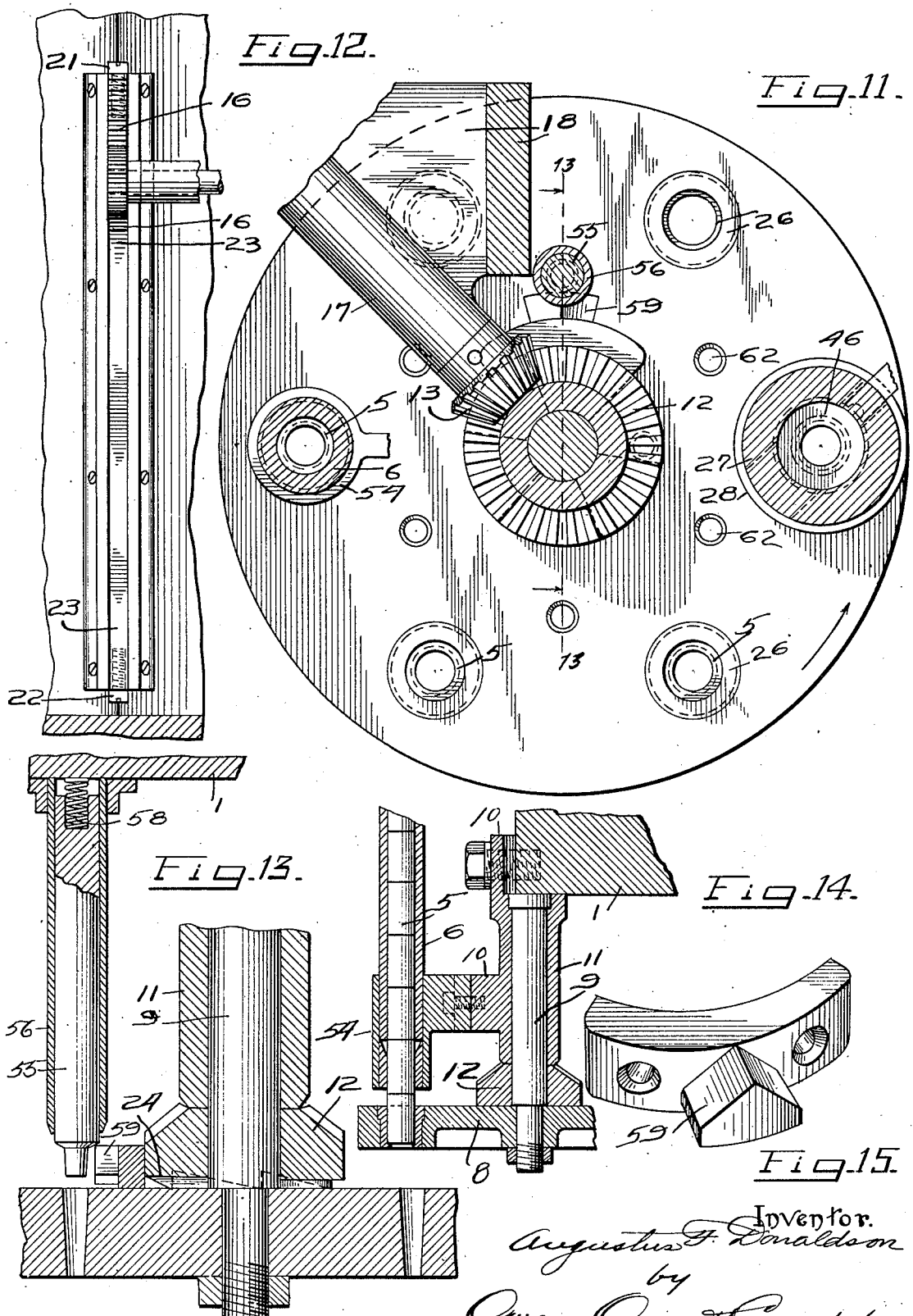

UNITED STATES PATENT OFFICE.

AUGUSTUS F. DONALDSON, OF TOLEDO, OHIO, ASSIGNOR TO THE BUNTING BRASS & BRONZE COMPANY, OF TOLEDO, OHIO, A CORPORATION OF OHIO.

INNER AND OUTER BROACHING-MACHINE.

1,318,486.

Specification of Letters Patent.

Patented Oct. 14, 1919.

Application filed May 19, 1917. Serial No. 169,644.

*To all whom it may concern:*

Be it known that I, AUGUSTUS F. DONALDSON, a citizen of the United States, and a resident of Toledo, in the county of Lucas and State of Ohio, have invented a certain new and useful Inner and Outer Broaching-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a broaching machine for broaching the exterior of cylindrical objects. It also has for its object to provide a machine that will broach the interior as well as the exterior of articles, such as bushings, in the same stroke or operation of the machine. Automatic feed mechanism may be provided for directing the articles to and away from the broaching tools.

The invention may be contained in many forms of constructions, all of which come within the purview of my claims hereinafter appended. For purposes of illustration I have selected one of such constructions as an example of the many constructions and arrangement of parts containing the invention, and shall describe it hereinafter. The construction selected is illustrated in the accompanying drawings.

Figure 1 of the drawings is a side view of the construction except for the actuating mechanism which may be of any suitable character and which forms no part of my invention. Fig. 2 illustrates a part of the feed actuating mechanism. Fig. 3 illustrates a section taken on the line 3—3 indicated in Fig. 1. Fig. 4 illustrates a top view of the construction. Fig. 5 is a broken view of a section of the construction taken on line 5—5 indicated in Fig. 9. Fig. 6 illustrates a stripper for removing the bushings from one of the broaches. Fig. 7 illustrates a roughing exterior broach ring. Fig. 8 is a sectional view taken on line 8—8 in Fig. 4. Fig. 9 is a sectional view taken on line 9—9 indicated in Fig. 1. Fig. 10 is a sectional view taken on line 10—10 indicated in Fig. 4. Fig. 11 is a view similar to that of Fig. 9, except that the feed mechanism is moved a short distance in its feeding operation. Fig. 12 is a view of a part of the feeding mechanism. Fig. 13 is a sectional view taken on line 13—13 indicated in Fig. 11. Fig. 14 is a sectional view taken on line 14—14 indicated in Fig. 4, and Fig. 15 illustrates a cam for opening a feed locking mechanism.

1, Fig. 1, is the ram, 34 is the bed plate, 3, Fig. 8, is the outside broach, and 4 is the inside broach. The ram is moved up and down by any suitable means, such as a crank and connecting rod, to produce relative movements of the bushings and broaching tools.

The bushings 5 are fed into a tube 6 by hand or by any suitable means. The tube 6 is supported in a sleeve secured to a bracket 11 and is located over a feed-plate 8, that is supported on a rod 9 for rotative movements, that is secured in a sleeve 10 forming a part of the bracket 11 that is secured to the ram 1. The plate 8 is rotated by means of a pair of bevel-gears 12 and 13, which are rotated by a shaft 14 and a spur-gear 15 connected to the shaft 14, operated upon by a rack 16. The shaft 14 is located in a sleeve 17 forming part of the bracket 18, which is also connected to the ram 1. The rack 16 moves in a channel formed in a bracket 19 secured to one of the guide-ways 20 of the ram 1. The bracket 19 is provided with stop-screws 21 and 22 located at the ends of the channel 23 for limiting the vertical movements of the rack 16. The rack 16 is lifted by the upward movement of the ram 1 and bracket 18 until the rack strikes the stop 21, as shown in Fig. 12, whereupon the gear-wheels 15, 13 and 12 are rotated. The lower face of the gear-wheel 12 is provided with a ratchet 24, while the plate 8 is provided with a spring pressed pin 25, movable in a sleeve 26 against a compression spring 27, located between a shoulder on the pin and the bottom of the sleeve and is limited in its movements by a pin 28, that moves in a slot 29 located in the sleeve 26. The ratchet 24 engages the pin 25 and thus rotates the plate one step. Upon the return movement of the ram 1 and bracket 18 the rack 16 is carried down until it strikes the stop 22, which causes re-rotation of the gear-wheels 15, 13, and 12, while the plate 8 is held in its position as hereinafter described, and thus causes another tooth of the ratchet 24 to engage the pin 25. Upon a return movement the rack 16 again strikes the stop 21 and again causes the plate to move another step forward.

The plate 8 is provided with a plurality of openings in which are located sleeves 26, that pass beneath the tube 6 thereby receiving bushings from the tube, which are conveyed between the broaching tools by the plate 8. The external broaching tool 3 is formed of rings that are secured in a socket in the end of the sleeve 27 secured to the ram 1, by means of a threaded ring 28. Any number of rings may be thus secured. I have shown two rings 29 and 30, the first is a cutting ring which removes the surface of the bushing when the bushing is pushed through the rings; the second is a burnishing ring which smoothes the surface of the bushings. The first is provided with a serrated cutting edge having raised cutting portions 31, the outer surfaces of which partake of the form of a cone and intermediate cutting portions 32 formed along the sides of the raised portions and in the channels between the raised portions which greatly extends the length of the cutting edge and prevents over-crowding of the metal and tends to break up the chips formed in the cutting operation. The ring 30 is provided with a beaded surface 33, which burnishes and slightly compacts the surface of the bushing.

The other broach 4 is secured to the bed 34 by means of a collar 35, which is clamped by a nut 36 onto the lower end of the broach and which is locked into the bed 34 by any suitable means, such as a turn-button 37. The broach is provided with a long pilot 38, cutting lips 39 and 40, compacting beads 41 and 42, a long cylindrical portion 43 and a shoulder 44. The pilot 38 has a rounded or beveled nose 45 for directing the bushing over the broach.

In the broaching operation the bushings 5 are brought into alinement with the broaching tools by the movements of the plate 8, and the ram carries the plate 8 downward so that the bushing in broaching position is carried over the nose 45 of the broach 4, which pushes the bushing up against the surfacing ring 29 and by reason of the greater resistance offered to the bushing by the cutting ring 29 the bushing is carried down over the broach 4 that cuts and compacts its inner surface until the bushing is pressed against the shoulder 44 of the broach 4 whereupon the bushing is held in position while the broach 3 passes over the bushing cutting and slightly compacting the outer surface of the bushing.

During the broaching operation a means may be provided for securely holding the broaching tools relative to each other and thus producing co-axial surfaces. A movable sleeve 46 may be located in the sleeve 27. The pilot 38 snugly fits the sleeve 46 and enters the sleeve which holds the broach 4 relative to the broaching tool 3 as the sleeve 46 slides along the sleeve 27. Upon the return movement of the broach 3 the bushing is caught by a spring ring 47 (Fig. 6), that is located in the socket above the ring 30 and provided with a beveled edge 48 to permit the bushing to pass the ring in its upward movement. The ring, however, will engage the lower end of the bushing on its return movement and prevent it from entering the ring 30. The bushing will thus be stripped from the broach 4 and will remain in the sleeve 27 until it is ejected therefrom.

An ejector rod 50 may be supported in a rod 51 secured in the ram 1. The outer end of the ejector rod has a pair of rollers 52 located on opposite sides of a cam-bar 53, that is bolted to an upright 54 secured to one of the guides 29 of the ram. The upper end of the bar 53 is inclined toward the ram so as to push the rod 50 inward. The inner end of the bar 50 is located in an opening in the sleeve 27 while opposite the bar 50 is located a second opening in the sleeve 27 large enough to permit the bushing to be pushed out of the sleeve by the inward movement of the rod 50 caused by the rollers 52 riding onto the upper end of the rod 53. The bushing may be caught by a suitable means, such as a trough, and directed away from the machine. By this arrangement the bushings are ejected from behind the outside broach. The bushings are passed up through the broach and operated upon by the cutting edge and burnishing the bead 33 and then stripped from the inside broach by the ring 47 and finally ejected by the rod 50 from behind the broach.

When the ram is moved down to near the lower end of its stroke the broach 4 is located in one of the sleeves 26 and the rack 16 strikes the lower stop 22, which causes the reverse movements of the gear-wheels 15, 13 and 12, the plate 8, however, being held stationary by the broach 4. This permits the ratchet 24 to move back and cause another of its teeth to engage the pin 25 so that when the rack is lifted by the wheel 15 and it strikes the stop 21 the ratchet is again caused to move the plate 8 another step, the plate 8 having been pulled clear of the broach 4.

The plate is also locked in position as the bushing slips over the nose of the broach 4 by a spring pressed pin 55 located in a sleeve 56 secured by a collar 57 to the ram 1 and is actuated by a spring 58 located in the sleeve between the end of the pin and the ram 1 and also by a cam 59, which is secured to the gear-wheel 12. The cam 59 operates on a beveled shoulder 60 to lift both when the rack is held by the stop 21 and when held by the stop 22. The lower end 61 of the pin is conical and enters holes 62 also cone shaped so as to move the plate together with the pin 25 slightly in advance of the last tooth to engage with the pin thereby insuring that the next to engage the pin will move well to the rear of the pin 25 and thus make certain the next forward movement of the plate. The plate is thus stepped around and the bushings are fed to the broaching tools and ejected from the machine by the rod 50.

I claim:

1. In a broaching machine, the combination of an outside broach, means for feeding bushings to the broach, means for producing relative movements of the broach and bushing, means located on the following side of the broach for engaging the bushing to prevent the return of the bushing in the broach; and means for ejecting the bushings from behind the broach.

2. In a broaching machine, the combination of an outside broach and an inside broach, and the inside broach having means for pushing the articles through the outside broach.

3. In a broaching machine, the combination of an outside broach and an inside broach, means for operating the inside broach to push articles through the outside broach, and a stripper means located on the following side of the outside broach for removing the bushings from the inside broach.

4. In a broaching machine, the combination of an outside broach and an inside broach, means for operating the inside broach to push articles through the outside broach, a stripper means located on the following side of the outside broach for removing the bushing from the inside broach, and means for ejecting the bushing from the outside broach.

5. In a broaching machine, the combination of an outside and an inside broach, means for feeding the articles to be operated upon by the broaches, and means for causing one of the broaches to engage the articles fed thereto and moving them relative to the other broach.

6. In a broaching machine, a ram, an outside broach connected to the ram, a feeding means connected to and reciprocated with the ram for feeding the article beneath the broach.

7. In a broaching machine, an inside and an outside broach, means for moving the broaches relative to each other, each broach operating to force the article along the other broach.

8. In a broaching machine, an inside and an outside broach, means for moving the broaches relative to each other, a stripper member located on the following side of the outside broach for removing the articles from the inside broach.

9. In a broaching machine, an outside broach, means for forcing the articles through the outside broach and a spring member for engaging the article to remove it from the said means.

10. In a broaching machine, a broach, a spring pressed clamping member for slipping by and engaging the articles to strip them from the broach and preventing the return of the articles through the outside broach.

11. In a broaching machine, a broach, a pair of spring pressed jaws opened by movement of the article on the broach through the jaws for engaging the articles to strip them from the broach.

12. In a broaching machine, an outside broach, and an inside broach, the inside broach having means for pushing the articles through the outside broach, and means for receiving the receiving end of the inside broach and holding it coaxial with the outside broach.

13. In a broaching machine, an outside broach and an inside broach, a collar for receiving the receiving end of the inside broach, means connected to the outside broach for guiding the collar and maintaining it in axial alinement with the outside broach.

14. In a broaching machine, an outside broach and an inside broach, the inside broach having a pilot of length sufficient to extend through the article, a movable member for receiving the pilot and means for retaining the member in axial alinement with the outside broach.

15. In a broaching machine, an outside broach and an inside broach, means for forcing the broaches over and through the article, a guide member for receiving the inside broach and maintaining the inside broach and the article in axial alinement with the outside broach.

16. In a broaching machine, an outside broach and an inside broach, means for forcing the broaches over and through the article, a guide member for receiving the inside broach and maintaining the inside broach and the article in axial alinement with the outside broach, means located between the outside broach and the guide member for stripping the article from the inside broach.

17. In a broaching machine, an outside broach and an inside broach, means for forcing the broaches over and through the article, a stripper member for engaging the article when it has passed through the outside broach and over the inside broach.

18. In a broaching machine, an outside broach and an inside broach, means for forcing the broaches over and through the article, a stripper member for engaging the article when it has passed through the outside broach and over the inside broach, and means for ejecting the article from the member.

19. In a machine for broaching articles, the combination of an outside broach, means for producing relative movements of the broach and articles, and means operating to eject the articles from the following end of the broach.

20. In a broaching machine, the combination of an outside broach and an inside broach, means for feeding articles to between the broaches, means for producing movements of the broach relative to the articles, and means for ejecting the articles from the following side of the outside broach.

21. In a broaching machine, the combination of an outside broach, means for producing relative movements of the broach and the article operated on by the broach, and a yielding means located on the following side of the broach for permitting the article to pass through the broach and the said means and engaging the article to prevent the return of the article through the broach.

22. In a broaching machine, a broach, a member having spring-pressed jaws opened by the movement of the articles through the jaws for stripping it from the broach.

23. In a machine for broaching bushings, a broach having a guide pilot, having a length sufficient to extend through the bushing, means for holding the bushing, a guide for receiving the pilot for holding the pilot and broach in a definite relation with respect to the bushing during the broaching of the bushing.

24. In a machine for broaching bushings, an outside broach and an inside broach, a ram connected to one of the broaches and means for feeding bushings to be operated upon by the broaches between the broaches.

25. In a machine for broaching bushings, an outside broach and an inside broach, a ram connected to one of the broaches, means for feeding the bushings to be operated upon by the broaches, and an ejecting means operating to eject the articles from the following side of the outside broach.

26. In a machine for broaching bushings, an outside broach and an inside broach, a ram connected to one of the broaches, means for feeding bushings to be operated upon by the broaches, and a yieldable stripper member located on the following end of the outside broach for engaging the bushing to strip it from the inside broach.

27. In a machine for broaching bushings, an outside broach and an inside broach, a ram connected to one of the broaches, means for feeding bushings to be operated upon by the broaches, a yieldable stripper member located on the following end of the outside broach for engaging the bushing to strip it from the inside broach, and an ejecting means for ejecting the bushings from the following side of the outside broach.

In testimony whereof I have hereunto signed my name to this specification.

AUGUSTUS F. DONALDSON.